O. E. ADAMSON.
RESILIENT WHEEL.
APPLICATION FILED FEB. 23, 1915.
1,155,332.
Patented Oct. 5, 1915.
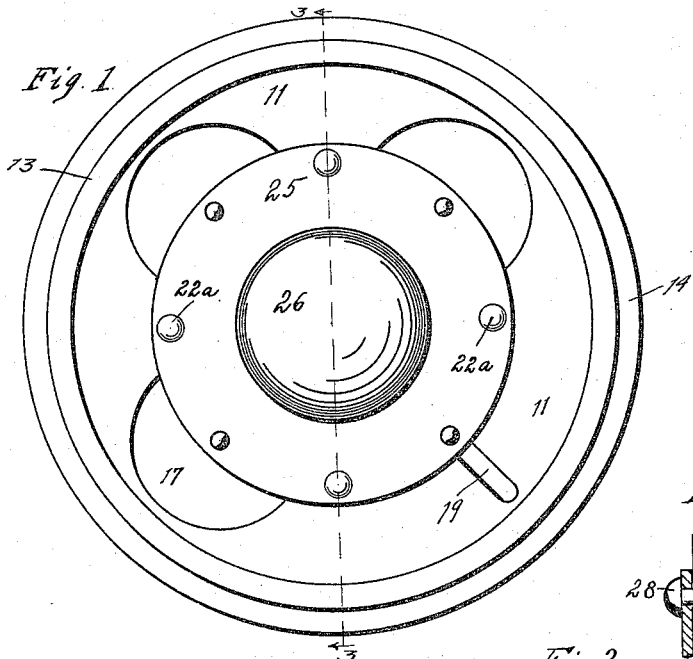
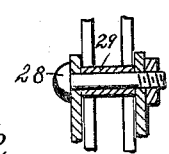
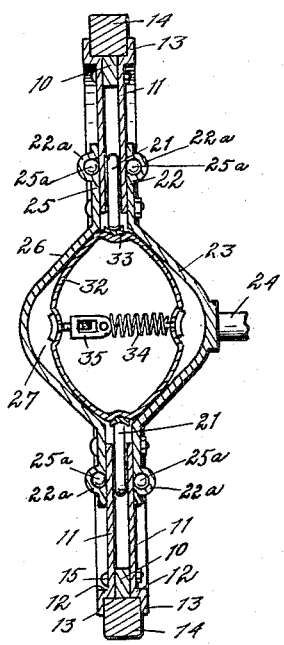
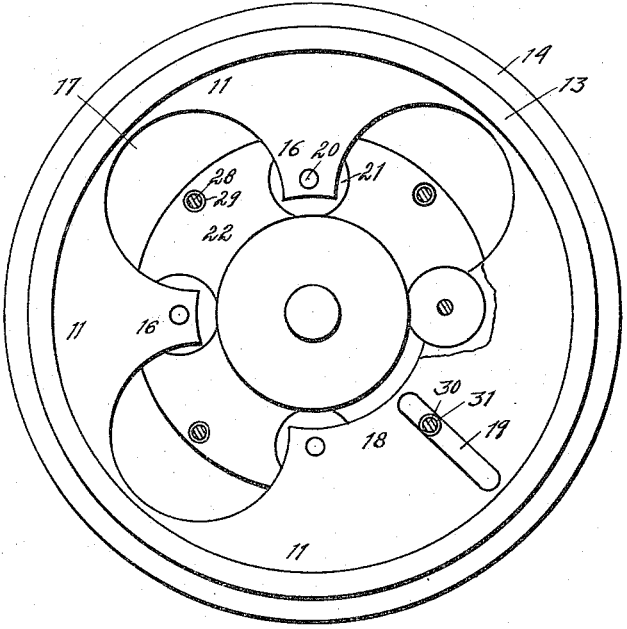
Witnesses.
G. F. Turecheh.
Will Freeman.
Inventor.
Oliver E. Adamson
By Orwig & Bair
Attys

UNITED STATES PATENT OFFICE.

OLIVER E. ADAMSON, OF GRIMES, IOWA.

RESILIENT WHEEL.

1,155,332. Specification of Letters Patent. Patented Oct. 5, 1915.

Application filed February 23, 1915. Serial No. 10,132.

*To all whom it may concern:*

Be it known that I, OLIVER E. ADAMSON, a citizen of the United States, and resident of Grimes, in the county of Polk and State of Iowa, have invented a certain new and useful Resilient Wheel, of which the following is a specification.

The object of my invention is to provide a resilient wheel of simple, durable and inexpensive construction.

More particularly it is my object to provide a resilient wheel of the type having cushioning devices at the axle.

Still a further object is to provide a resilient wheel of the type mentioned, having a central pneumatic member adapted to receive and carry the load.

Still a further object is to provide such a device in which the pneumatic member is reinforced and aided by a spring device.

Still a further object is to provide such a wheel having a pneumatic member of peculiar shape adapted to give a maximum resiliency.

My invention consists in the construction, combination and arrangement of the various parts of my device, whereby the objects are contemplated, as hereinafter more fully set forth, pointed out in my claims and illustrated in the accompanying drawings, in which:

Figure 1 shows a side elevation of a wheel embodying my invention. Fig. 2 shows a similar view, the outside plate being removed. Fig. 3 shows a vertical, sectional view taken on the line 3—3 of Fig. 1. Fig. 4 shows a transverse, sectional view in detail, illustrating the method of attaching the two outer plates.

In the exemplification of my invention illustrated in the accompanying drawings, I have shown a wheel built up in the following way: An outer rim is indicated by the reference numeral 10. On each side of the outer rim is a web 11. Each web 11 at its outer edge is provided with a laterally extending flange 12, at the end of which is an outwardly extending flange 13. Between the flanges 13 is a rubber tire 14. The webs 11 are secured to the rim 10 by means of bolts 15. The webs 11 are provided with successive, inwardly extending portions 16. Between the successive inwardly extending portions the webs are cut away at 17. One portion similar to the portion 16, indicated by the reference character 18, is wider than the portion 16, and has a radial slot 19 formed in it. The inner ends of the members or portions 16 of the respective webs 11 are secured together by means of bolts 20, on which between the members 16 are rollers or wheels 21, the peripheries of which are smooth and rounded, as shown in Fig. 3.

The central portion of the inside of the wheel is covered by a plate 22, the central portion of which extends inwardly at 23 toward the center of a vehicle, and is fixed to the axle 24. The outside of the wheel, as the central portion thereof, is covered by a similar plate 25, the central portion 26 of which is extended away from the center of the vehicle, as shown. Between the portions 23 and 26 is a receptacle 27 of considerable size. The plates 22 and 25 are secured together by means of bolts 28 located between the successive members 16. On the bolts 28 between the plates 22 and 25 are spacing sleeves 29. The plates 22 and 25 are held against rotation with relation to the webs 11 by means of a bolt 30 and a sleeve 31 thereon, which extend through the plates 22 and 25 and also through the radial slots 19 and in the portions 18 of the webs 11. The plates 22 and 25 are provided with bearings $22^a$ which contain balls $25^a$ which engage and travel on the portions 16 and reduce the friction between the parts 16 and the plates 22 and 25 to a minimum.

Received within the receptacle 27 is a pneumatic bag 32 which is so shaped that it has a groove 33 in its outer surface adapted to receive the wheels 21, as clearly shown in Fig. 3. In the groove 33 between the bag 32 and the wheels 21 is a band of suitable material to take the wear of the wheels 21 and to protect the bag 32. The opposite sides of the pneumatic bag 32 are connected together by means of the spring 34 and the tension adjusting device 35, as shown. The bag 32 is of such shape that normally it does not extend to position where it touches the members 26 and 23 at their extreme points.

In the practical operation of my improved resilient wheel, the wheel having once been installed, it will be seen that the members 22 and 25 may slide with relation to the members 16, depending on the load imposed upon the wheel, and that the movement of the load will be cushioned by means of the pneumatic bag 32 which supports the rollers 21. The use of the spring 34 makes it possible to secure with a device of this kind a resiliency which could not otherwise be had. The bolt 30 prevents rotation of the plates 22 and 25 with relation to the portions 16.

The parts are so built up that they may be quickly and easily assembled or taken apart for purposes of repair or replacement. It will be understood that some changes may be made in the construction and arrangement of the parts of my resilient wheel without departing from its essential features and purposes, and it is my intent to cover by this application any such changes which may be included within the scope of my claims.

I claim as my invention:

1. In a device of the class described, a rim, a plurality of pairs of opposite webs secured thereto, rollers mounted between said webs, central plates secured on opposite sides of the inner portions of said webs, the central portions of said plates being spaced from each other to form a receptacle, means for locking said central plates together, and means for securing said central plates to said webs for permitting sliding movement of the plates with relation to the webs and for preventing rotation of the plates with relation to the webs, a pneumatic device received within said receptacle engaging said rollers, and an axle secured to one of said plates, extending away from said device.

2. In a device of the class described, a rim, opposite webs secured thereto, rollers mounted between said webs, central plates secured on opposite sides of the inner portions of said webs, the central portions of said plates being spaced from each other to form a receptacle, means for locking said central plates together, and means for securing said central plates to said webs for permitting sliding movement of the plates with relation to the webs and for preventing rotation of the plates with relation to the webs, a pneumatic device received within said receptacle having a groove in its surface receiving said rollers and an axle secured to one plate and extending away from said device.

3. In a device of the class described, a rim, opposite webs secured thereto, rollers mounted between said webs, central plates secured on opposite sides of the inner portions of said webs, the central portions of said plates being spaced from each other to form a receptacle, an axle secured to one of said central portions and extending away from the receptacle, means for locking said central plates together, means for securing said central plates to said webs for permitting sliding movement of the plates with relation to the webs and for preventing rotation of the plates with relation to the webs, a pneumatic device received within said receptacle, and an adjustable spring device mounted in said pneumatic device for yieldingly limiting its expansion in one direction.

Des Moines, Iowa, January 19, 1915.

OLIVER E. ADAMSON.

Witnesses:
A. SHERMAN,
J. MAHER.

Copies of this patent may be obtained for five cents each, by addressing the "Commissioner of Patents, Washington, D. C."